United States Patent [19]
Arnold

[11] Patent Number: 5,929,866
[45] Date of Patent: *Jul. 27, 1999

[54] ADJUSTING CONTRAST IN ANTI-ALIASING

[75] Inventor: R. David Arnold, Mountain View, Calif.

[73] Assignee: Adobe Systems, Inc, Mountain View, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/591,924

[22] Filed: Jan. 25, 1996

[51] Int. Cl.⁶ ................................... G06T 11/40
[52] U.S. Cl. .............................................. 345/471
[58] Field of Search ..................... 395/167, 172, 395/132, 169, 170, 131, 171; 345/471

[56] References Cited

U.S. PATENT DOCUMENTS

| | | | |
|---|---|---|---|
| 4,331,955 | 5/1982 | Hansen | 345/136 |
| 4,486,785 | 12/1984 | Lasher et al. | 358/447 |
| 4,580,231 | 4/1986 | Tidd et al. | 395/774 |
| 4,591,844 | 5/1986 | Hickin et al. | 345/136 |
| 4,667,247 | 5/1987 | Karow | 358/406 |
| 4,672,369 | 6/1987 | Preiss et al. | 345/132 |
| 4,675,830 | 6/1987 | Hawkins | 395/138 |
| 4,720,705 | 1/1988 | Gupta et al. | 345/20 |
| 4,783,652 | 11/1988 | Lumelsky | 345/197 |
| 4,827,255 | 5/1989 | Ishii | 345/148 |
| 4,851,825 | 7/1989 | Naiman | 345/132 |
| 4,907,282 | 3/1990 | Daly et al. | 382/242 |
| 4,908,780 | 3/1990 | Priem et al. | 395/135 |
| 4,945,351 | 7/1990 | Naiman | 345/147 |
| 5,099,435 | 3/1992 | Collins et al. | 395/169 |
| 5,241,653 | 8/1993 | Collins et al. | 395/139 |
| 5,278,678 | 1/1994 | Harrington | 358/518 |
| 5,301,267 | 4/1994 | Hassett et al. | 395/169 |
| 5,386,509 | 1/1995 | Suzuki et al. | 395/523 |
| 5,398,306 | 3/1995 | Karow | 395/110 |
| 5,459,828 | 10/1995 | Zack et al. | 345/472 |
| 5,568,697 | 10/1996 | Nakayama et al. | 345/432 |
| 5,771,048 | 6/1998 | Nankou et al. | 345/471 |

FOREIGN PATENT DOCUMENTS

| | | |
|---|---|---|
| 0 214 547 | 3/1987 | European Pat. Off. . |
| 0 428 356 | 5/1991 | European Pat. Off. . |
| 0 468 652 | 1/1992 | European Pat. Off. . |
| 0 506 381 | 9/1992 | European Pat. Off. . |
| 0 304 509 | 6/1993 | European Pat. Off. . |
| 0 654 778 | 5/1995 | European Pat. Off. . |
| 0 667 596 | 8/1995 | European Pat. Off. . |
| 900039606 | 10/1991 | Japan . |
| 86/04703 | 8/1986 | WIPO . |

OTHER PUBLICATIONS

Foley et al.; "Computer Graphics Principles and Practice—Second Edition"; Addison–Wesley Publishing Company; 1990; pp. 132–140, pp. 617–646, and pp. 965–979.

*Primary Examiner*—Anton Fetting
*Attorney, Agent, or Firm*—Fish & Richardson P.C.

[57] ABSTRACT

A method and apparatus for processing a character for anti-aliased display on a raster output device. A set of density values is computed for a set of raster positions to represent the character and the density values of the set are scaled to extend their range upward toward a maximum density value, whereby generally at least one of the density values of the set becomes the maximum density value. In one embodiment, the set of density values is computed from a rendering of the character at resolution higher than the resolution of the output device. In another embodiment, the character is created by a font having font metrics including a reference dimension, and the density values are scaled by computing adjusted values as a non-decreasing function of the original values, the function being defined to compute a maximum adjusted density value for at least one non-maximum density value.

24 Claims, 6 Drawing Sheets

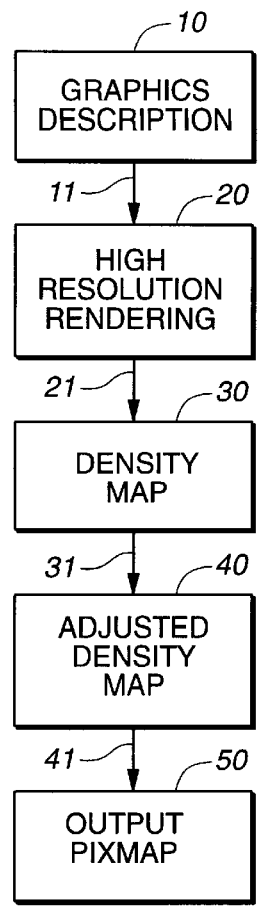
FIG._1a
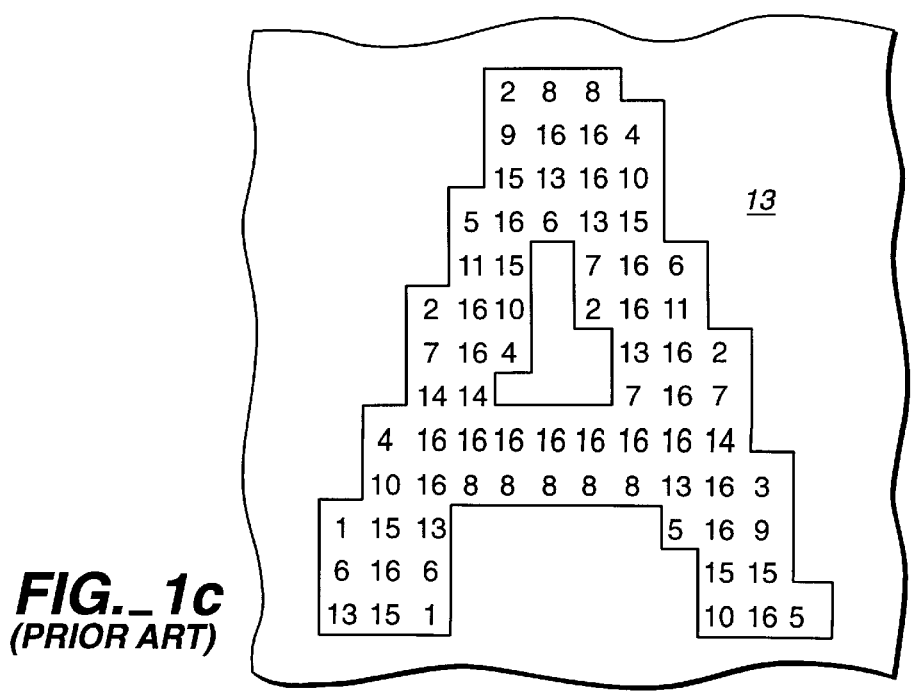
FIG._1c
*(PRIOR ART)*

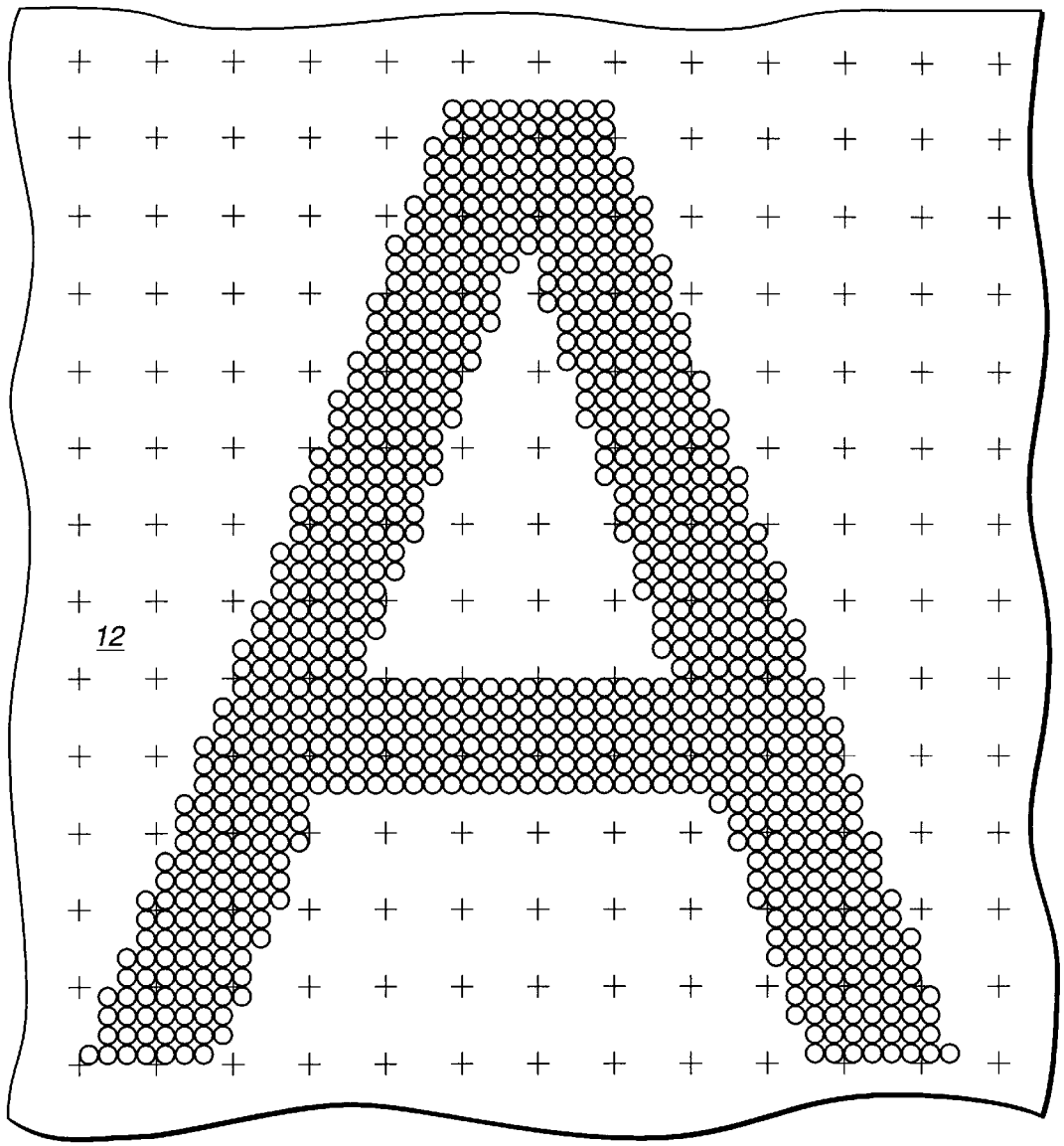
FIG._1b (PRIOR ART)

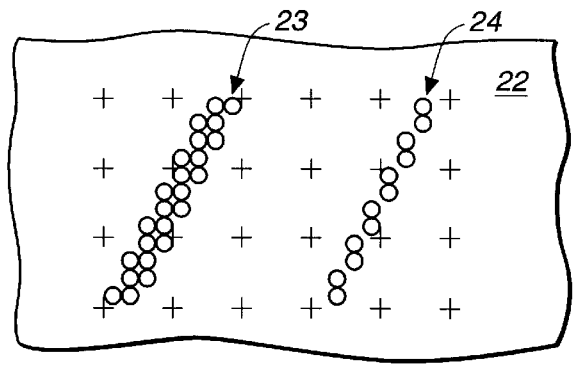
FIG._2
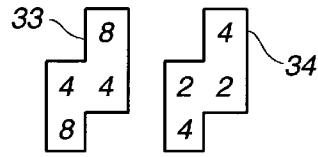
FIG._3
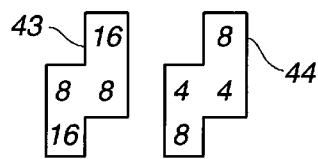
FIG._4
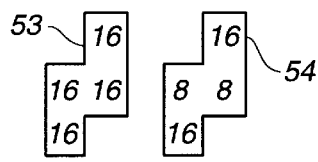
FIG._5
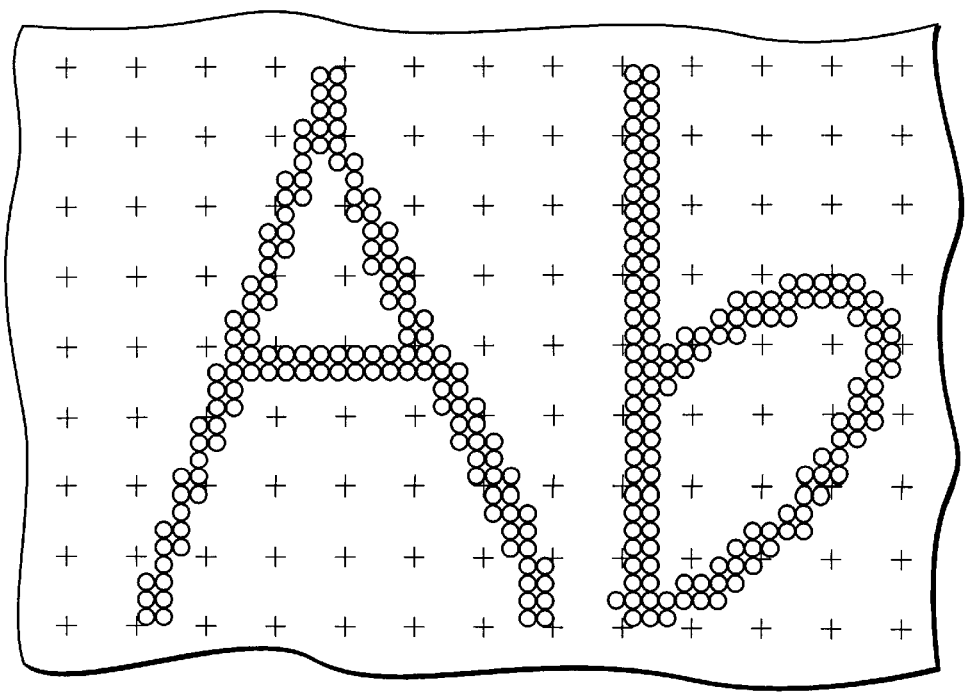
FIG._7a

FIG. 6

| Original Density \ Index | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|
| 16 | 16 | 16 | 16 | 16 | 16 | 16 | 16 | 16 | 16 | 16 | 16 | 16 | 16 | 16 | 16 |
| 15 | 16 | 16 | 16 | 16 | 16 | 16 | 16 | 16 | 16 | 16 | 16 | 16 | 16 | 16 | 15 |
| 14 | 16 | 16 | 16 | 16 | 16 | 16 | 16 | 16 | 16 | 16 | 16 | 16 | 16 | 15 | 14 |
| 13 | 16 | 16 | 16 | 16 | 16 | 16 | 16 | 16 | 16 | 16 | 16 | 16 | 15 | 14 | 13 |
| 12 | 16 | 16 | 16 | 16 | 16 | 16 | 16 | 16 | 16 | 16 | 16 | 15 | 14 | 13 | 12 |
| 11 | 16 | 16 | 16 | 16 | 16 | 16 | 16 | 16 | 16 | 16 | 15 | 14 | 13 | 12 | 11 |
| 10 | 16 | 16 | 16 | 16 | 16 | 16 | 16 | 16 | 16 | 15 | 13 | 12 | 11 | 11 | 10 |
| 9  | 16 | 16 | 16 | 16 | 16 | 16 | 16 | 16 | 14 | 13 | 12 | 11 | 10 | 10 | 9  |
| 8  | 16 | 16 | 16 | 16 | 16 | 16 | 16 | 14 | 13 | 12 | 11 | 10 | 9  | 9  | 8  |
| 7  | 16 | 16 | 16 | 16 | 16 | 16 | 14 | 12 | 11 | 10 | 9  | 9  | 8  | 7  | 7  |
| 6  | 16 | 16 | 16 | 16 | 16 | 14 | 12 | 11 | 10 | 9  | 8  | 7  | 7  | 6  | 6  |
| 5  | 16 | 16 | 16 | 16 | 13 | 11 | 10 | 9  | 8  | 7  | 7  | 6  | 6  | 5  | 5  |
| 4  | 16 | 16 | 16 | 13 | 11 | 9  | 8  | 7  | 6  | 6  | 5  | 5  | 5  | 4  | 4  |
| 3  | 16 | 16 | 12 | 10 | 8  | 7  | 6  | 5  | 5  | 4  | 4  | 4  | 3  | 3  | 3  |
| 2  | 16 | 11 | 8  | 6  | 5  | 5  | 4  | 4  | 3  | 3  | 3  | 2  | 2  | 2  | 2  |
| 1  | 8  | 5  | 4  | 3  | 3  | 2  | 2  | 2  | 2  | 1  | 1  | 1  | 1  | 1  | 1  |
| 0  | 0  | 0  | 0  | 0  | 0  | 0  | 0  | 0  | 0  | 0  | 0  | 0  | 0  | 0  | 0  |

Columns: ADJUSTED DENSITY VALUES. Rows: ORIGINAL DENSITY VALUES. Bottom: INDEX VALUES. Reference: 60.

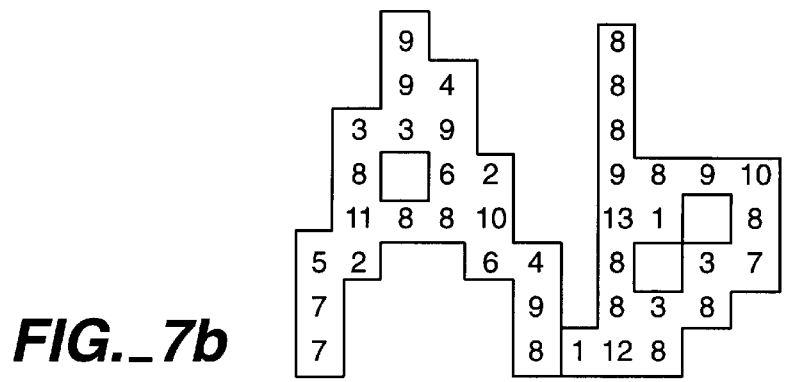
FIG._7b
| DENSITY: | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| ADJUSTED DENSITY: | 0 | 3 | 6 | 10 | 13 | 16 | 16 | 16 | 16 | 16 | 16 | 16 | 16 | 16 | 16 | 16 | 16 |
FIG._7c
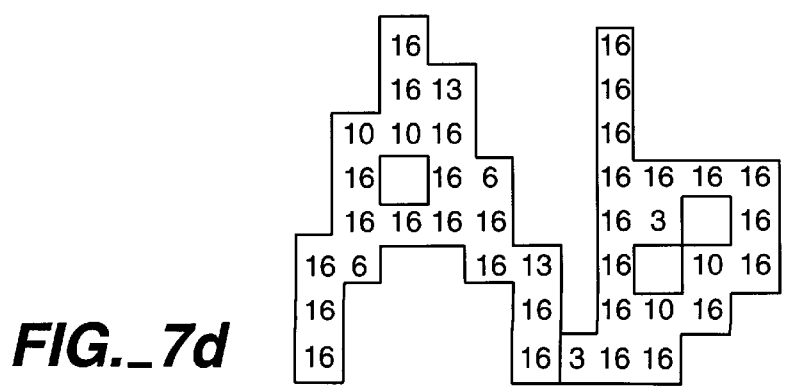
FIG._7d

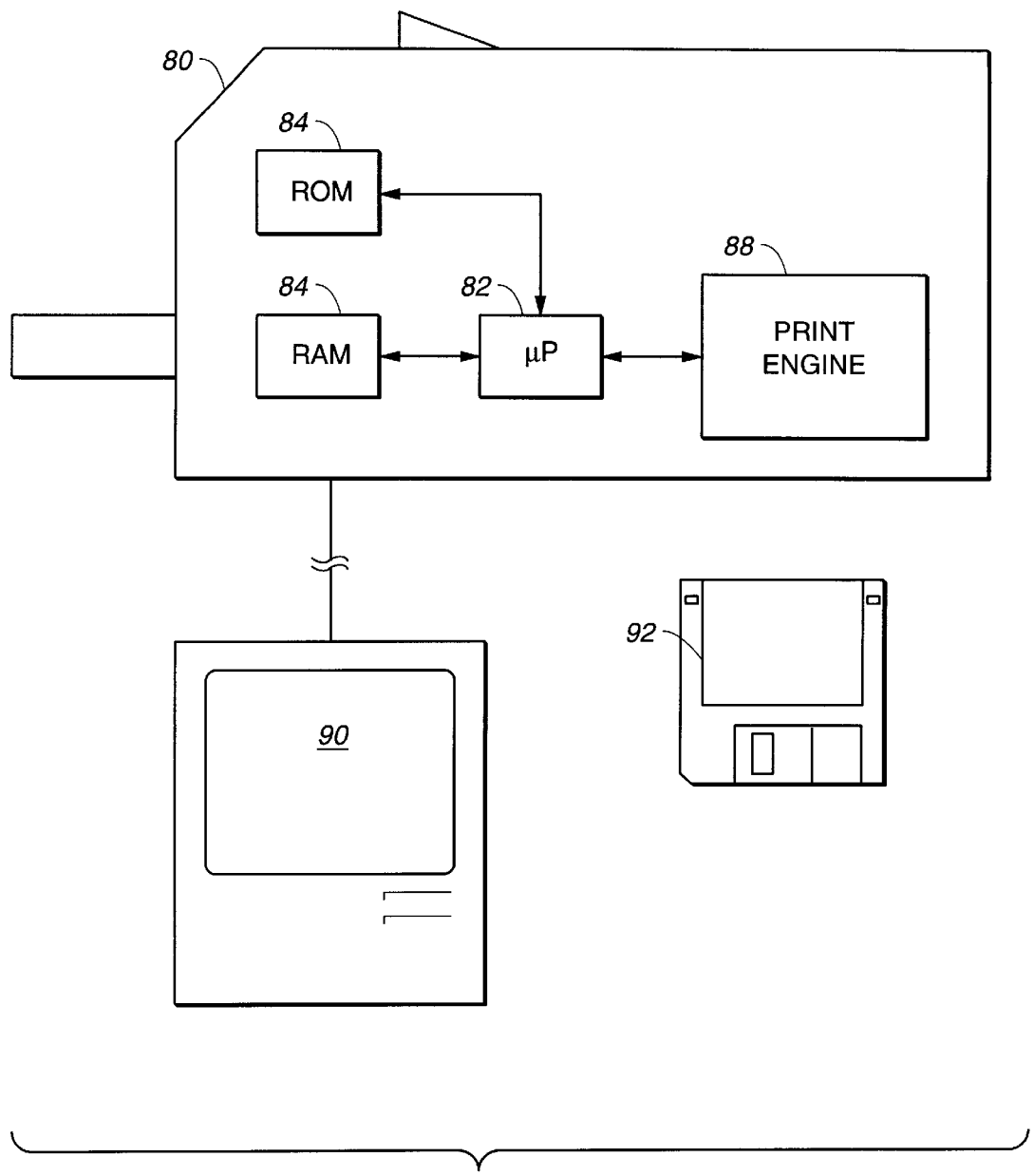
FIG._8

ADJUSTING CONTRAST IN ANTI-ALIASING

BACKGROUND OF THE INVENTION

CROSS REFERENCE TO RELATED APPLICATIONS

The present invention is related to commonly assigned U.S. patent application Ser. No. 08/547,562, filed on Oct. 23, 1995 and entitled METHOD AND APPARATUS FOR RENDERING CHARACTERS, the disclosure of which is incorporated herein by this reference.

FIELD OF THE INVENTION

The invention relates to the computer-implemented rendering of font characters for display on raster output devices, and more particularly, to the display of anti-aliased character strokes for small characters.

BACKGROUND

An alphabet of characters with a particular design is called a "typeface". A "font" is a collection of instructions that a processor, such as a microprocessor controlling a printer, can use to create text (the characters of the alphabet) in a particular typeface. A font used in a computer is generally stored in one or more disk files. A font used by a printer is generally stored in a read-only memory, downloaded from some computer into printer random access memory, or loaded from a disk attached to the printer directly or remotely.

As used herein, a character may be any form of monochromatic character, number, symbol, icon, graphic, or the like that can be displayed as a graphical element on an output device. A text character consists of at least one stroke, which may be straight or curved and has a nonzero width. The specific appearance of a character on an output device is created by its font. Present-day fonts, such as PostScript™ fonts available from Adobe Systems Incorporated of Mountain View, Calif., generally include a graphics description providing the outline of the character as it is to be displayed, an are for that reason referred to as outline fonts.

A character is generally presented on an output device as an image consisting of pixels (picture elements) arranged in the rows and columns of a raster. If a pixel on the output device has only two possible tone values (e.g., a background color such as white and a foreground color such as black, for normal text documents), the image pixels can be encoded each as a single bit. If the output device can have more than two tone values at each pixel position (e.g., tones ranging from the background color, through blends of the background and foreground colors, to the foreground color), more than one bit must be used to represent the possible pixel values.

Computers and computer printers generally scan-convert outline font characters for display on raster output devices. The result of this interpretation or rendering of the characters results in a bit map of one-bit pixels or in a run array of scan lines indicating the positions of background-foreground transitions. The rendering may be thought of as providing a set of pixels each representing one of two colors: a background color or a foreground color. (The term "pixel" is used for both the physical output viewed on a printed page or a display monitor, for example, and for the data element in a computer; however, the meaning will be clear from the context.) For characters elements having edges that are not aligned with the raster of the output device, the edges of the displayed image may have a jagged appearance. This effect is called aliasing.

The jagged edges can be smoothed by anti-aliasing techniques such as those explained in "Computer Graphics, Principles and Practice", Second Edition, by James D. Foley et al. One type of anti-aliasing that can be performed for output devices capable of displaying more than two tones is to soften a jagged edge by shading pixels along the edge.

Anti-aliasing techniques have provided good results for large characters. However, they have encountered problems with smaller characters. As type size is reduced relative to output device resolution, a character's strokes may be reduced in width to less than one output pixel. When anti-aliasing shades such narrow strokes, the strokes tend to fade, which can make the resulting output hard to read.

SUMMARY OF THE INVENTION

In general, in one aspect, the invention provides a computer-implemented method for processing a character for anti-aliased display on a raster output device. The method includes computing a set of density values for a set of raster positions to represent the character and scaling the density values of the set to extend their range upward toward a maximum density value, whereby generally at least one of the density values of the set becomes the maximum density value. In another aspect, the set of density values is computed from a rendering of the character at resolution higher than the resolution of the output device. In another aspect, the character is created by a font having font metrics including a reference dimension, and the density values are scaled by computing adjusted values as a non-decreasing function of the original values, the function being defined to compute a maximum adjusted density value for at least one non-maximum density value.

In general, in another aspect, the invention provides a computer-implemented method for processing a character for anti-aliased display on a raster output device having an output pixel position, the character being created at a type size by a font having font metrics including a reference dimension. The method includes rendering the character at a resolution higher than the output resolution, computing an original density value for the output pixel position from the rendering, and computing an adjusted density value by applying an adjustment function to the original density value, the adjustment function being defined to compute a maximum adjusted density value when applied to a range of one or more non-maximum original density values. In another aspect, the step of rendering the character generates bit values of a bit map or of a set of run array lines having a resolution higher than the output resolution, and the original density value is computed as a function of bit values generated in the rendering step. In another aspect, the original density value is computed as a sum of bit values generated in the rendering step for positions that correspond to the output pixel position. In another aspect, the reference dimension is a scalable measure of a standard stem width for a vertical or horizontal stem.

In another aspect, the method includes computing a pixel value for the output pixel position from the adjusted density value, where the pixel value is computed by blending a foreground color and a background color according to the adjusted density value, and where foreground and background color are a chromatic color or a gray scale value. In another aspect, the method includes comparing the scaled reference dimension to a threshold value and bypassing the step of adjusting the density value if the threshold value is exceeded. In another aspect, the method includes caching the adjusted density value for the event that anti-aliasing needs to be performed again for the character of the font. In another aspect, the adjustment function is a function of the original density value and an index value, the adjustment function being defined to compute a maximum adjusted density value when applied to an original density values that is greater than or equal to the index value. In another aspect, the adjustment function uses the index value to select a precomputed table that maps a density derived from the higher-resolution rendering to a value, where the map defines a non-decreasing function. In another aspect, the index value is approximately a maximum density value times the reference dimension scaled to the type size divided by a threshold stem width. In another aspect, the threshold stem width is in the range of approximately 1.0 to 2.3 pixels.

In general, in another aspect, the invention provides an anti-aliasing method for displaying a character on a raster output device having an output resolution, including, in general, steps of rendering the character, computing a set of density values, scaling the density values, computing pixel values for output device pixel positions, and displaying the pixel values on the output device.

In general, in another aspect, the invention provides a computer program storage device—such as a read-only, semiconductor memory device, such as an EPROM, or a magnetic disk, a magneto-optical disk, or a CD-ROM disk—tangibly embodying a set of computer-readable computer program instructions including, in various aspects, instructions for practicing the methods of the invention as are described here.

The invention has a number of advantages.

For example, the invention provides small characters that are readable and have little fading or distortion. Use may be made of the invention without affecting the anti-aliasing of large characters and without changing the overall inked appearance of a page.

For a fuller understanding of the nature and further advantages of the invention, reference should be made to the detailed description taken in conjunction with the accompanying drawings.

BRIEF DESCRIPTION OF THE DRAWINGS

The accompanying drawings, which are incorporated in and constitute a part of the specification, schematically illustrate specific embodiments of the invention and, together with the general description given above and the detailed description of the embodiments given below, serve to explain the principles of the invention.

FIG. 1a is flow diagram of a method of rendering characters using an anti-aliasing technique according to the present invention.

FIGS. 1b and 1c illustrate a typical prior art method for anti-aliasing a character.

FIG. 2 illustrates a high resolution bit map for two character strokes and their neighboring area.

FIG. 3 illustrates a density map for the bit map of FIG. 2.

FIGS. 4 and 5 each illustrate an adjusted density map for the bit map of FIG. 2 according to the present invention.

FIG. 6 is a table illustrating a mapping of original density values to adjusted density values according to the present invention.

FIG. 7a illustrates a high resolution bit map.

FIG. 7b illustrates a density map created from the high resolution bit map of FIG. 7a.

FIG. 7c is an adjustment map extracted from the table of FIG. 6, based on an index value of five.

FIG. 7d is an adjusted density map, resulting from applying the adjustment map of FIG. 7c to the density map of FIG. 7b.

FIG. 8 is a diagram illustrating apparatus embodying the present invention.

DETAILED DESCRIPTION

Referring to FIG. 1, in a process for preparing a character for display on an output device (such as a monitor or printer) according to the present invention, a graphics description 10 for the character is rendered into a high resolution rendering 20 (such as a high resolution bit map) having a higher resolution than is supported by the output device. (Step 11) The graphics description 10 is generally an outline font program. In other embodiments, the graphics description may take other forms, including the form of a high resolution bit map, in which case the rendering step (step 11) is not necessary and the resolution of the rendering 20 may be taken as that given by the graphics description. An outline font graphics description rendered to any resolution by a rendering program available from a variety of sources, including Adobe Systems. As used here, resolution refers to the spacial density of pixels in an internal computer representation or on an output device, which is often expressed in terms of dots per inch.

From the high resolution rendering 20, a density map 30 is created at the output device resolution. (Step 21) Each density element of the density map 30 is computed from a plurality of elements (for example, bits) in the high resolution rendering 20. In one embodiment, a box filter function illustrated in FIGS. 2 and 3, the value of each density element is computed as the sum of the bit values of the high resolution bit map bit positions corresponding to the density element.

The value assigned to a density element may be thought of as representing a tone, ranging from a background color to a foreground color. Having the same resolution, each density element of the density map corresponds to a pixel position on the output device, and the value of a density element may be used to determine the tone at the corresponding output pixel. For example, for a density element having a value of zero, the tone of the output pixel may be set to a background color; for a density element having a maximum value, the tone of the output pixel may be set to a foreground color; and for a density element having an intermediate value, the tone of the output pixel will be a blend of the background and foreground colors.

An adjusted density map 40 is created from the density map 30 by adjusting the density map values to compensate for any fading expected to occur. (Step 31) This step may be performed on the density map as a whole after it is developed, or on parts of it as it is being developed.

Finally, an output pixel map or pixmap map 50 is computed from the adjusted density map 40 by assigning a corresponding output pixel value to each density element. (Step 41) This step may be performed on the adjusted density map as a whole after it is developed, or on parts of it as it is being developed, or in parallel with the step of creating a density map. Thus, it is not necessary that the high resolution rendering 20 be completed before the creation of the density map 30 is begun, nor is it necessary that the creation of the density map 30 be completed before the creation of adjusted density map 40 is begun, nor is it necessary that the creation of the adjusted density map 40 be completed before the creation of the output pixel map 50 is begun. Moreover, data structures may be used in practicing the invention other than the bit maps, pixel maps, and tables that are used here for the sake of illustration.

Referring to FIGS. 1b and 1c, in a prior art method for anti-aliasing, the character is rendered as a bit map 12 at a resolution higher than that supported by the output device. Then, a density map 13 is computed at the same resolution as the output device. (For clarity, zero values are not shown in the density map.) Each element of the density map is computed as a function of numerous bits in the high resolution bit map 12, in a process called super sampling. The specific function used to combine the samples is called the filter. Then, a device pixel map is computed for output. Each device pixel corresponds to one density element. The color or value of the device pixel is computed by blending a foreground color and background color according to the corresponding density element. For zero density, the result is equal to the background color. For maximum density, the result is equal to the foreground color, and at intermediate densities the color is a blend of the two. It will be understood that the densities described here run linearly from a minimum to a maximum value, and that in generating output for a typical color output device, such a color monitor, system non-linearities must be taken into account to achieve the desired visual effect.

Exemplary bit maps and density maps illustrating the present invention are shown in FIGS. 2 through 5. FIG. 2 shows a high resolution bit map 22 for two character strokes 23 and 24 and a neighboring area. The circles in the figure represent the bits in a high resolution bit map for the character strokes and the crosses define the lower output resolution supported by an output device. In this example, the high resolution bit map has four times the resolution of the output device in both the x and y directions, and each density element and each output pixel of the output device corresponds to sixteen bits arranged in 4×4 formation on the high resolution bit map. The left stroke 23 has a stroke width of 0.5 pixels; the right stroke 24, of 0.25 pixels (at the output device resolution).

The density maps 33 and 34 shown in FIG. 3 result from applying a filter function to the graphical elements represented in FIG. 2. A variety of filter functions may be used, and the specific function used in this example is a box filter function, which gives equal weight to each of the sixteen high resolution bit map bits corresponding to a density element, and computes a value for that density element as the total number of high resolution bit map bits within the corresponding area. It should be noted, however, that a filter function may take as input overlapping ranges of bits in the high resolution bit map, in which case a value of one high resolution bit can affect more than one density element and its corresponding output pixel.

Referring to FIG. 3, the density values of the adjusted density maps 43 and 44 are adjusted from the corresponding density maps 33 and 34 (FIG. 3) in order to ensure adequate contrast in situations where fading is likely to occur. (Step 31) Adjustment can be made by a variety of methods. The adjustment function used in calculating the values of the adjusted density map 43 and 44 simply multiplies each original density value by a factor of two, with the result being limited to a maximum value of sixteen. Similarly, the adjustment function used to create the adjusted density maps 53 and 54 shown in FIG. 5 multiplies each original density value by a factor of four, with the same limiting maximum value of sixteen. The adjustment used in FIG. 4 is sufficient to cause some density values in the wider stroke 43 to reach a maximum value, but none of those of the narrower stroke 44. Thus, if stroke 44 were of the standard stem width, for example, the adjustment illustrated in FIG. 5 would provide better contrast than the adjustment of FIG. 4. Furthermore, if it were desired to have a pixel of a maximum density value on each scan line, the adjustment of FIG. 5 would be selected over that of FIG. 4 for a standard stem width of stroke 23 (stroke 53 in FIG. 5).

Adjusted density maps 40 may optionally be cached, to permit re-use of the calculation of the adjusted density values for an output device resolution, even if the output device bit depth changes.

As has been mentioned, the original density values are adjusted to increase contrast in situations where anti-aliasing is likely to result in fading. In one embodiment, the density map 30 is adjusted only when it appears that a fading problem may exist. This situation may be identified by comparing a reference dimension of the character font (such as a standard stem width scaled to the type size at which the character is being rendered) to a stroke width threshold. The threshold may be obtained in a variety of ways: it may be predetermined, for example, or it may be set by user input. A threshold value found to work well is 1.5 output pixels. When the threshold value is equal to or greater than the reference dimension scaled to the output type size, the values in the original density map are adjusted to increase the density values assigned to some of the output pixels, as will be described.

A font typically has font metrics, which generally include scalable dimensions such as a standard stem width for a character, which is scaled to the type size at which the font is rendered. (A stem in a font is a stroke or a part of a stroke, typically aligned vertically or horizontally.) A scaled stem width, such as a scaled standard horizontal or vertical stem width, of a font generally provides a good estimate of stroke width. In one embodiment, the density values for output pixels at the core of a character stroke of the standard width are generally adjusted to a maximum density value, resulting in output characters that retain high contrast, avoid fading at small type sizes relative to the output raster resolution, and are therefore easier to read than they would be without the adjustment.

Density map adjustment may be made using a table 60 such as is illustrated in FIG. 6, which maps an original density value and an index to an adjusted density value. Note the generally diagonal structure, from lower left to upper right, of this table. Note also that in this example, the index value is the same as the lowest original density value that is mapped to 16, representing a maximum output density.

In this embodiment, the index is calculated as follows:

$$\text{index} = \text{round}\left[20 \times \frac{\text{scaled stroke width} + 1/4}{\text{threshold} + 1/4}\right] - 4$$

with the result clipped to the range of 2 to 16. (The "scaled stroke width" and "threshold" are both in units of output device pixels. The scaled stroke width is the standard stroke width reference dimension (in the units of the character space) scaled to the output type size.) Other functions may be used to map the original density values into a larger range of adjusted density values. The particular mapping function selected will vary depending on the desired result.

This embodiment will be further described with reference to the high resolution rendering illustrated in FIG. 7a. FIG. 7b illustrates the density map resulting from application of the box filter function described above. Assuming a scaled standard stem width of 0.5 and a threshold of 1.5, the index calculated in accordance the function above is 5. For an index of 5, the table shown in FIG. 6 defines an adjustment function mapping original density values to adjusted density values, and the columns of interest have been isolated in the adjustment map shown in FIG. 7c.

FIG. 7d shows the result of applying this adjustment to the original density map shown in FIG. 7b. The adjusted density values shown in FIG. 7d will result in an output image having increased contrast between the tones of character strokes of standard width and the background color, thereby reducing any fading that otherwise may have occurred.

The threshold value of 1.5 pixels has been found to give pleasing results for a range of fonts for the English alphabet. The use of this threshold value is illustrated in FIG. 7d. A higher value, empirically on the order of 2.25 pixels, generally results in standard width strokes having a maximum density pixel on each scan line through which the stroke passes, regardless. A lower value of approximately 1.0 gives that result only for standard width strokes that are substantially horizontal or vertical.

Referring to FIG. 8, it will be well understood that the methods described here may be readily implemented in hardware or in a computer program product tangibly embodied in a computer program storage device for execution by a computer processor. A present-day printer 80 implementing an interpreter for a page description language, such as PostScript, includes a microprocessor 82 for executing program instructions (including font instructions) stored on a printer random access memory 84 and a printer read-only memory (ROM) 84 and controlling a printer print engine 88. The essential elements of a computer are a processor for executing instructions and a memory, and these will be found in desktop computer 90 and other computers suitable for executing computer programs implementing the methods described here, which may be used in conjunction with any print engine, display monitor, or other raster output device capable of producing color or gray scale pixels. Generally, a computer will include both a read-only memory and a random access memory. Storage devices suitable for tangibly embodying computer program instructions implementing the methods described here include all forms of non-volatile memory, including semiconductor memory devices, such as EPROM, EEPROM, and flash memory devices, magnetic disks such as internal hard disks and removable disks 92, magneto-optical disks, and CD-ROM disks.

The present invention has been described in terms of specific embodiments. The invention, however, is not limited to these specific embodiments. Rather, the scope of the invention is defined by the following claims, and other embodiments are within the scope of the claims. For example, various anti-aliasing techniques may be used without diminishing the advantages of the present invention. In one variation, rather than using a rendering in a higher resolution bit map, a run array made up of scan lines at the higher resolution that identify the locations of the transitions may be used instead.

What is claimed is:

1. A computer-implemented method for processing a character for anti-aliased display on a raster output device where the character is created at a type size by a font having font metrics including a standard stem width, the method comprising:

computing a set of density values to provide one density value for each of a set of raster positions to represent the character on the raster output device; and comparing (i) the standard stem width scaled to the type size to (ii) a threshold value, and if the threshold value is exceeded increasing at least one of the density values in the computed set of density values, thereby compensating for fading that may occur in the display of the character on the raster output device.

2. The method of claim 1 where the output device has a resolution and the set of density values is computed from a rendering of the character at resolution higher than the resolution of the output device.

3. The method of claim 1 where the density values are scaled by computing adjusted values as a non-decreasing function of the original values, the function being defined to compute a maximum adjusted density value for at least one non-maximum density value.

4. A computer-implemented method for processing a character for anti-aliased display on a raster output device having an output resolution and one or more output pixel positions for display of the character, the character being created at a type size by a font having font metrics including a reference dimension, the method comprising:

rendering the character at a resolution higher than the output resolution;

computing a set of original density values, one for each output pixel position used to display the character, from the rendering, wherein the set of original density values includes a highest density value;

computing an adjusted density value for at least one computed original density value by applying an adjustment function to the original density value, the adjustment function being defined to compute an adjusted density value having a maximum value when the adjustment function is applied to the highest density value; and comparing (i) the reference dimension scaled to the type size to (ii) a threshold value, and bypassing the step computing an adjusted density value if the threshold value is exceeded.

5. The method of claim 4 where the step of rendering the character generates bit values of a bit map or of a set of run array lines having a resolution higher than the output resolution; and the original density value is computed as a function of bit values generated in the rendering step.

6. The method of claim 5 where the original density value is computed as a sum of bit values generated in the rendering step for positions that correspond to the output pixel position.

7. The method of claim 4 where the reference dimension is a scalable measure of a standard stem width for a vertical or horizontal stem.

8. The method of claim 4 further comprising:

computing a pixel value for the output pixel position from the adjusted density value, where the pixel value is computed by blending a foreground color and a background color according to the adjusted density value, and where foreground and background color are a chromatic color or a gray scale value; and displaying pixel values on the raster output device.

9. The method of claim 4 further comprising the step of caching the adjusted density value for use if anti-aliasing needs to be performed again for the character of the font.

10. A computer-implemented method for processing a character for anti-aliased display on a raster output device having an output resolution and one or more output pixel positions for display of the character, the character being created at a type size by a font having font metrics including a reference dimension, the method comprising:

rendering the character at a resolution higher than the output resolution;

computing a set of original density values, one for each output pixel position used to display the character, from the rendering, wherein the set of original density values includes a highest density value; and computing an adjusted density value for at least one computed original density value by applying an adjustment function to the original density value, where the adjustment function is a function of the original density value and an index value and where the index value is approximately a maximum density value times the reference dimension scaled to the type size divided by a threshold stem width, the adjustment function being defined to compute a maximum value when applied to an original density value that is greater than or equal to the index value.

11. The method of claim 10 where the adjustment function uses the index value to select a precomputed table that maps a density derived from the higher-resolution rendering to a value, where the table defines a non-decreasing function.

12. The method of claim 10 where the threshold stem width is in the range of approximately 1.0 to 2.3 pixels.

13. A storage device readable by a machine, tangibly embodying a set of computer-readable computer program instructions comprising instructions for processing a character for anti-aliased display on a raster output device where the character is created at a type size by a font having font metrics including standard stem width, the set of instructions comprising:

instructions for computing a set of density values for a set of raster positions to represent the character; and instructions for comparing (i) the standard stem width scaled to the type size to (ii) a threshold value, and if the threshold value is exceeded increasing at least one of the density values of the set thereby compensating for fading that may occur in the display of the character on the raster output device.

14. The apparatus of claim 13 where the output device has a resolution and the instructions for scaling the set of density values computes from a rendering of the character at resolution higher than the resolution of the output device.

15. The apparatus of claim 13 where the instructions for scaling the set of density values compute adjusted values as a non-decreasing function of the original values, the function being defined to compute a maximum adjusted density value for at least one non-maximum density value.

16. A storage device readable by a machine, tangibly embodying a set of computer-readable computer program instructions comprising instructions for processing a character for anti-aliased display on a raster output device having an output pixel position, the character being created at a type size by a font having font metrics including a reference dimension, the set of instructions comprising:

instructions for rendering the character at a resolution higher than the output resolution;

instructions for computing a set of original density values, one for each output pixel position, from the rendering, wherein the set of original density values includes a highest density value;

instructions for computing an adjusted density value for at least one computed original density value by applying an adjustment function to the original density value, the adjustment function being defined to compute an adjusted density value having a maximum density value when the adjustment function is applied to the highest density value; and instructions for comparing (i) the reference dimension scaled to the type size to (ii) a threshold value, and bypassing the step of computing an adjusted density value if the threshold value is exceeded.

17. The apparatus of claim 16 where the instructions for rendering the character generates bit values of a bit map or of a set of run array lines having a resolution higher than the output resolution; and the instructions for computing an original density value compute a function of bit values generated by the rendering instructions.

18. The apparatus of claim 17 where the original density value is computed as a sum of bit values generated in the rendering step for positions that correspond to the output pixel position.

19. The apparatus of claim 16 where the reference dimension is a scalable measure of a standard stem width for a vertical or horizontal stem.

20. The apparatus of claim 16 further comprising:

instructions for computing a pixel value for the output pixel position from the adjusted density value, where the pixel value is computed by blending a foreground color and a background color according to the adjusted density value, and where foreground and background color are a chromatic color or a gray scale value; and instructions for displaying pixel values on the raster output device.

21. The apparatus of claim 16 further comprising:

instructions for caching the adjusted density value for use if anti-aliasing needs to be performed again for the character of the font.

22. A storage device readable by a machine, tangibly embodying a set of computer-readable computer Program instructions comprising instructions for processing a character for anti-aliased display on a raster output device having an output pixel position, the character being created at a type size by a font having font metrics including a reference dimension, the set of instructions comprising:

instructions for rendering the character at a resolution higher than the output resolution;

instructions for computing a set of original density values, one for each output pixel position, from the rendering, wherein the set of original density values includes a highest density value; and instructions for computing an adjusted density value for at least one computed original density value by applying an adjustment function to the original density value, the adjustment function is a function of the original density value and an index value and where the index value is approximately a maximum density value times the reference dimension scaled to the type size divided by a threshold stem width, the adjustment function being defined to compute a maximum density value when applied to an original density value that is greater than or equal to the index value.

23. The apparatus of claim 22 where the adjustment function uses the index value to select a precomputed table that maps a density derived from the higher-resolution rendering to a value, where the table defines a non-decreasing function.

24. The apparatus of claim 22 where the threshold stem width is in the range of approximately 1.0 to 2.3 pixels.

* * * * *